(12) United States Patent
Son et al.

(10) Patent No.: US 11,407,414 B2
(45) Date of Patent: Aug. 9, 2022

(54) METHOD AND APPARATUS FOR CONTROLLING VEHICLE DRIVING DEPENDING ON BABY MODE

(71) Applicants: HYUNDAI MOTOR COMPANY, Seoul (KR); KIA MOTORS CORPORATION, Seoul (KR)

(72) Inventors: Hui Un Son, Suwon-si (KR); Sang Joon Kim, Seoul (KR); Kyu Hwan Jo, Yongin-si (KR); Sung Bae Jeon, Ansan-si (KR); Sung Hoon Yu, Hwaseong-si (KR); Joo Young Kim, Hwaseong-si (KR); Jin Kyeom Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 218 days.

(21) Appl. No.: 16/850,706

(22) Filed: Apr. 16, 2020

(65) Prior Publication Data
US 2021/0179104 A1 Jun. 17, 2021

(30) Foreign Application Priority Data
Dec. 17, 2019 (KR) .......................... 10-2019-0169109

(51) Int. Cl.
*G06F 17/00* (2019.01)
*B60W 30/14* (2006.01)
(Continued)

(52) U.S. Cl.
CPC ........ *B60W 30/146* (2013.01); *B60W 30/162* (2013.01); *B60W 30/18009* (2013.01);
(Continued)

(58) Field of Classification Search
IPC ........... B60W 40/08,30/146, 30/162, 30/18009, 2040/0881, 2540/00, 30/045,
(Continued)

(56) References Cited

U.S. PATENT DOCUMENTS

| 11,040,619 | B1* | 6/2021 | Martin | ................. G06N 3/0454 |
| 2002/0169532 | A1* | 11/2002 | Zhang | ................ G06K 9/00362 |
| | | | | 701/45 |
| 2020/0010077 | A1* | 1/2020 | Cormack | .............. B60W 40/08 |

FOREIGN PATENT DOCUMENTS

| KR | 10-1103528 B1 | 1/2012 |
| KR | 10-1245101 B1 | 3/2013 |

(Continued)

OTHER PUBLICATIONS

Watabe Daiji, WO2018047873—Acceleration/Deceleration Control System, and Acceleration/Deceleration Control Method, 2018. (Year: 2018).*

*Primary Examiner* — Ronnie M Mancho
(74) *Attorney, Agent, or Firm* — McDonnell Boehnen Hulbert & Berghoff LLP

(57) ABSTRACT

Disclosed herein is a method of controlling a vehicle driving depending on a baby mode, including activating an apparatus for automatically controlling and limiting a speed of a vehicle, and determining a state of a car seat when the car seat is installed, correcting a speed profile of the apparatus for automatically controlling and limiting the speed of the vehicle based on the state of the car seat, determining whether the vehicle enters a turning section, when the vehicle enters the turning section, performing at least one of turning section acceleration control or turning section deceleration control based on the state of the car seat, and determining whether the vehicle passes through the turning section after performing at least one of the turning section acceleration or deceleration.

19 Claims, 14 Drawing Sheets

(51) Int. Cl.
  *B60W 30/18* (2012.01)
  *B60W 40/08* (2012.01)
  *B60W 30/16* (2020.01)

(52) U.S. Cl.
  CPC ..... *B60W 40/08* (2013.01); *B60W 2040/0881* (2013.01); *B60W 2540/00* (2013.01)

(58) Field of Classification Search
  IPC ........................ 30/143, 40/105, 40/107, 40/109, 2520/105, 2720/10, 2720/103, 2720/125; B60N 2/2806; B60Y 2300/045, 2300/143
  See application file for complete search history.

(56) References Cited

FOREIGN PATENT DOCUMENTS

| KR | 10-1415208 B1 | 8/2014 | |
|---|---|---|---|
| KR | 2015-0061781 A | 6/2015 | |
| KR | 10-1693847 B1 | 1/2017 | |
| KR | 10-1837393 B1 | 4/2018 | |
| KR | 10-1907332 B1 | 10/2018 | |
| KR | 2019-0070552 A | 6/2019 | |
| WO | WO-2018047873 A1 * | 3/2018 | .......... B60W 40/076 |

* cited by examiner

METHOD AND APPARATUS FOR CONTROLLING VEHICLE DRIVING DEPENDING ON BABY MODE

CROSS REFERENCE TO RELATED APPLICATIONS

This application claims the benefit of Korean Patent Application No. 10-2019-0169109, filed on Dec. 17, 2019, which is hereby incorporated by reference as if fully set forth herein.

BACKGROUND

Field

The present disclosure relates to a method and apparatus for controlling vehicle driving depending on a baby mode.

Discussion of the Related Art

In general, a smart cruise control apparatus of a vehicle is an apparatus for enabling a vehicle to automatically travel at a preset vehicle speed without manipulation of an accelerator pedal of a driver and is also referred to as a cruise control apparatus.

When the target vehicle speed is set by simple manipulation of a driver, the smart cruise control apparatus controls a vehicle speed to the target vehicle speed set by the driver to remarkably reduce manipulation of the accelerator pedal of the driver, thereby enhancing driving convenience.

There are various products for preventing the infant's head from deviating from a car seat due to lateral acceleration when a vehicle turns. In particular, in the case of an infant, since a ratio of the head to the whole weight is high and the neck bone is not developed, it is recommended to fix the head by a cushion to prevent the head from shaking. When the infant's head deviates from a car seat due to a behavior of a vehicle, there is a problem in terms of occurrence of accidents due to crash in the state in which the head deviates from the car seat as well as degradation in ride comfort.

SUMMARY

Accordingly, the present disclosure is directed to a method and apparatus for controlling vehicle driving depending on a baby mode for correcting an appropriate speed and acceleration profile when a vehicle turns according to whether a car seat is installed in a forward facing state or a rearward facing state.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of controlling a vehicle driving depending on a baby mode includes activating an apparatus for automatically controlling and limiting a speed of a vehicle, and determining a state of a car seat when the car seat is installed, correcting a speed profile of the apparatus for automatically controlling and limiting the speed of the vehicle based on the state of the car seat, determining whether the vehicle enters a turning section, when the vehicle enters the turning section, performing at least one of turning section acceleration control or turning section deceleration control based on the state of the car seat, and determining whether the vehicle passes through the turning section after performing at least one of the turning section acceleration or deceleration.

In another aspect of the present disclosure, a vehicle driving control apparatus includes a longitudinal acceleration correction amount calculator configured to activate an apparatus for automatically controlling and limiting a speed of a vehicle, to determine a state of a car seat when the car seat is installed, and to correct a speed profile of the apparatus for automatically controlling and limiting the speed of the vehicle based on the state of the car seat, a speed and acceleration profile corrector configured to determine whether the vehicle enters a turning section, and to perform at least one of turning section acceleration control or turning section deceleration control based on the state of the car seat when the vehicle enters the turning section, and a control torque calculator configured to calculate control torque in response to a profile received from the longitudinal acceleration correction amount calculator and the speed and acceleration profile corrector.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principle of the disclosure. In the drawings.

DETAILED DESCRIPTION

Reference will now be made in detail to the exemplary embodiments of the present disclosure, examples of which are illustrated in the accompanying drawings. The suffixes "module" and "unit" of elements herein are used for convenience of description and thus can be used interchangeably and do not have any distinguishable meanings or functions.

In the description of exemplary embodiments, it will be understood that, when an element is referred to as being "on", "under", "before" or "after" another element, the element can be directly on the other element, or intervening elements may be present.

It will be understood that, although the terms "first", "second", "A", "B", "(a)", "(b)", etc. may be used herein to describe various elements of the present disclosure, these terms are only used to distinguish one element from another element, and the essential order or sequence of corresponding elements is not limited by these terms. It will be understood that when one element is referred to as being "connected to", "coupled to", or "accessing" another element, the one element may be "connected to" or "coupled to" or "access" the other element via a further element, or the one element may be directly connected to or directly access another element.

The terms "comprises", "includes", and "has" described herein should be interpreted not to exclude other elements but to further include such other elements since the corresponding elements may be included unless specifically mentioned otherwise. All terms including technical or scientific terms have the same meanings as those generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

Figure 1:
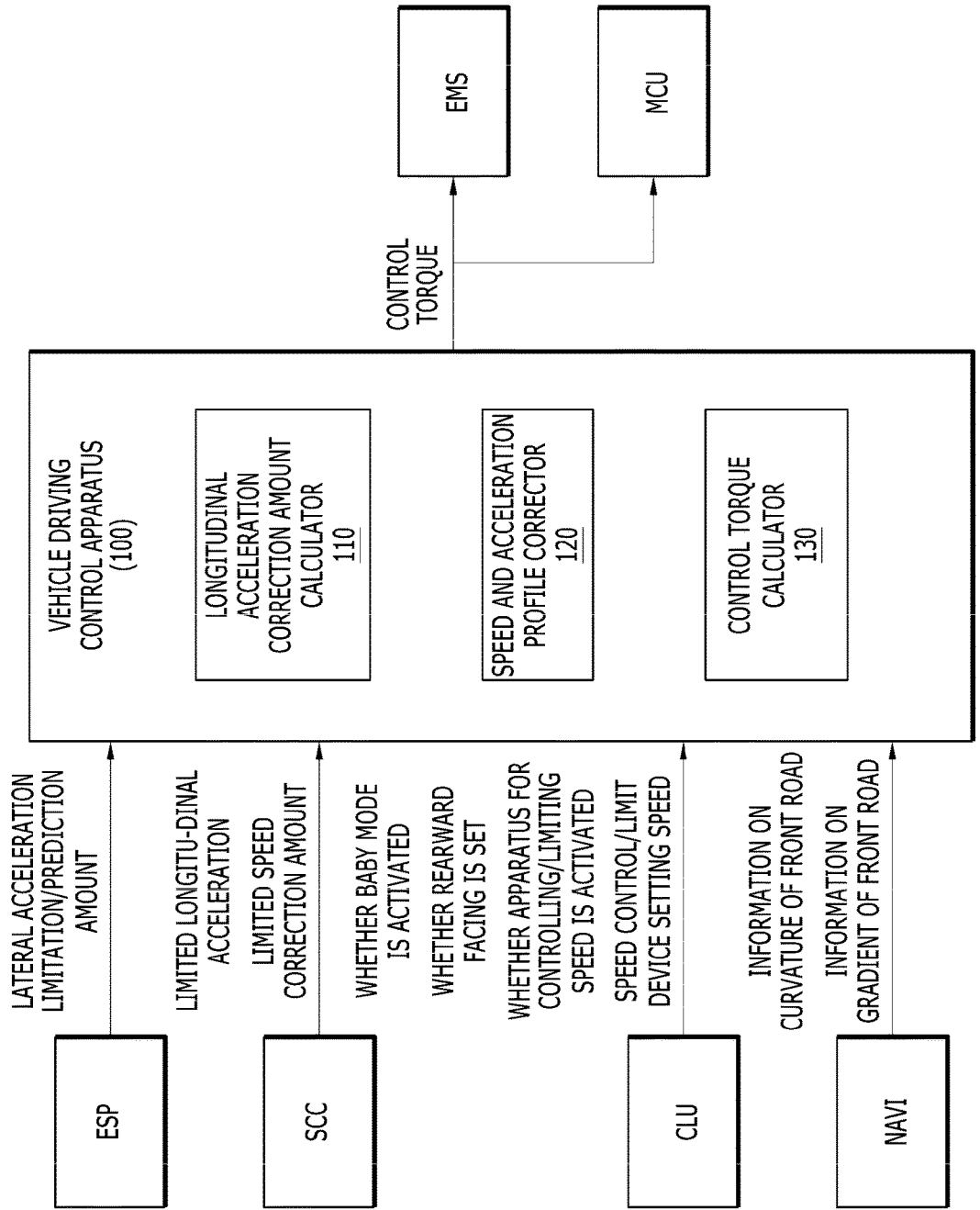
FIG. 1 is a diagram illustrating a vehicle using a vehicle driving control apparatus according to an embodiment of the present disclosure.

FIG. 1 is a diagram illustrating a vehicle using a vehicle driving control apparatus 100 according to an embodiment of the present disclosure.

Referring to FIG. 1, the vehicle driving control apparatus 100 may include a longitudinal acceleration correction amount calculator 110, a speed and acceleration profile corrector 120, and a control torque calculator 130.

The vehicle driving control apparatus 100 may receive state information of a vehicle from sensors in the vehicle.

That is, the vehicle driving control apparatus 100 may receive information on a lateral acceleration limitation and prediction amount from an electronic stability program (ESP: a vehicle control apparatus), may receive a limited longitudinal acceleration and a limited speed correction amount from a smart cruise control (SCC), may receive information on whether a baby mode is activated, whether rearward facing is set, whether a speed control device is activated, or a speed set by the speed control device from a cluster (CLU), and may receive information on a curvature of a front road and information on a gradient of the front road from a navigation device (NAVI).

The vehicle driving control apparatus 100 may receive information on whether a baby mode is activated depending on whether a car seat is installed.

When an apparatus for automatically controlling and limiting a speed of a vehicle is activated to activate the baby mode, the longitudinal acceleration correction amount calculator 110 may determine the state of the car seat based on whether rearward facing is set. The state of the car seat may include a forward facing state and rearward facing state.

The longitudinal acceleration correction amount calculator 110 may correct a speed profile of the apparatus for automatically controlling and limiting a speed of a vehicle based on the state of the car seat.

In some embodiments, when the car seat is in the forward facing state, the longitudinal acceleration correction amount calculator 110 may calculate a longitudinal deceleration correction amount of the apparatus for automatically controlling and limiting a speed.

In some embodiments, when the car seat in the rearward facing state, the longitudinal acceleration correction amount calculator 110 may calculate a longitudinal acceleration correction amount of the apparatus for automatically controlling and limiting a speed.

When the speed control device of the vehicle is activated, the longitudinal acceleration correction amount calculator 110 may correct a profile of the vehicle based on an angle at which the car seat is installed.

When the vehicle turns, the longitudinal acceleration correction amount calculator 110 may calculate a minimum value as a longitudinal acceleration correction amount based on a MAP set in response to a lateral acceleration and a limited longitudinal acceleration of the apparatus for automatically controlling and limiting a speed. The MAP is data that stores the force exerted on the car seat according to the lateral acceleration.

The speed and acceleration profile corrector 120 may determine whether the vehicle enters a turning section.

When the vehicle enters the turning section, the speed and acceleration profile corrector 120 may perform at least one of turning section acceleration control or turning section deceleration control.

In some embodiments, when performing the turning section acceleration control, the speed and acceleration profile corrector 120 may perform deceleration control at a threshold position prior to entry into the turning section by a threshold distance, and after the deceleration control, may enter the turning section and may perform the turning section acceleration control in response to the calculated longitudinal acceleration correction amount.

In some embodiments, when performing the turning section acceleration control, if there is a limited speed of the apparatus for automatically controlling and limiting a speed or the lowest speed on a road, the speed and acceleration profile corrector 120 may perform deceleration control at a second threshold position prior to entry into the turning section by a second threshold distance, and after the deceleration control, may enter the turning section and may perform turning section acceleration control in response to the calculated limited longitudinal acceleration correction amount.

In some embodiments, when performing the turning section deceleration control, the speed and acceleration profile corrector 120 may perform deceleration control based on the calculated longitudinal acceleration correction amount in the turning section, and after an escape from the turning section, may perform acceleration control at a setting speed of the apparatus for automatically controlling and limiting a speed.

In some embodiments, when performing the turning section deceleration control, if there is a limited speed of the apparatus for automatically controlling and limiting a speed or the lowest speed on a road, the speed and acceleration profile corrector 120 may perform deceleration control based on the limited longitudinal acceleration correction amount, and after an escape from the turning section, the speed and acceleration profile corrector 120 may perform acceleration control at a setting speed of the apparatus for automatically controlling and limiting a speed.

The control torque calculator 130 may calculate control torque in response to the profile received from the longitudinal acceleration correction amount calculator 110 and the speed and acceleration profile corrector 120 and may output the control torque to a motor and an engine of the vehicle.

Figure 2A:
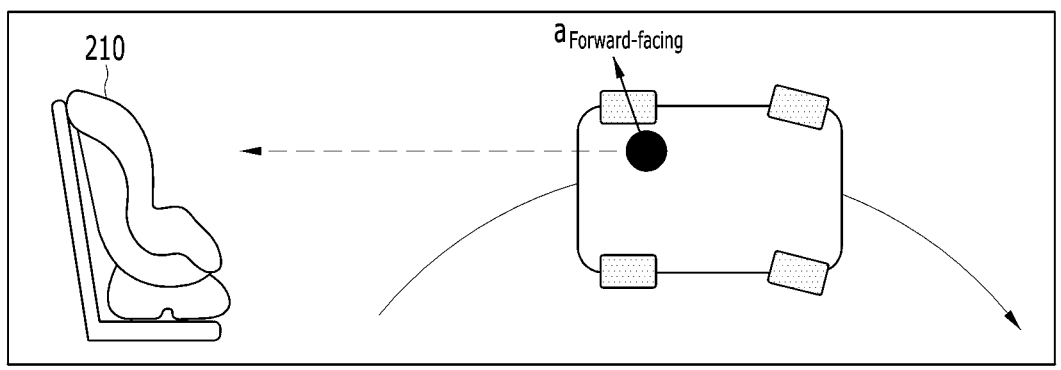
FIGS. 2A and 2B are diagrams illustrating acceleration depending on the state of a car seat according to an embodiment of the present disclosure.
Figure 2B:
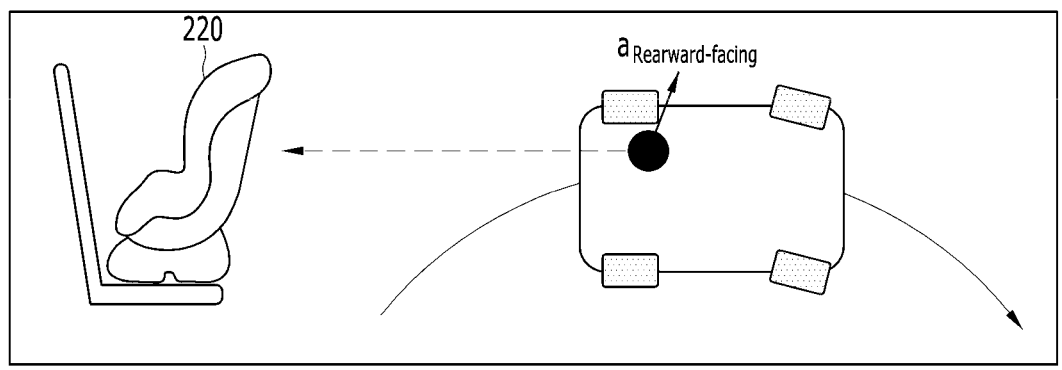

FIGS. 2A and 2B are diagrams illustrating acceleration depending on the state of a car seat according to an embodiment of the present disclosure.

Referring to FIGS. 2A and 2B, a speed/acceleration profile may be corrected to prevent the infant's head from deviating from the car seat when a vehicle turns. The vehicle driving control apparatus 100 may control the speed and acceleration of the vehicle depending on a state in which a car seat is installed in the vehicle. The state in which the car seat is installed may include a forward facing state 210 in which a proceeding direction of the vehicle and a forward direction of the car seat face are the same, and a rearward facing state 220 in which the proceeding direction of the vehicle and the forward direction of the car seat are opposite to each other.

Referring to FIG. 2A, when the car seat disposed in the vehicle is in the forward facing state 210 and the vehicle travels in a turning section, acceleration may be applied to a forward direction of the car seat ($a_{Forward\text{-}facing}$). To prevent this, the vehicle may be decelerated before traveling in the turning section and may be accelerated while traveling in the turning section.

Referring to FIG. 2B, when the car seat disposed in the vehicle is in the rearward facing state 220 and the vehicle travels in the turning section, acceleration may be applied to a forward direction of the car seat ($a_{rearward\text{-}facing}$). To prevent this, the vehicle may be decelerated while traveling in the turning section.

Figure 3A:
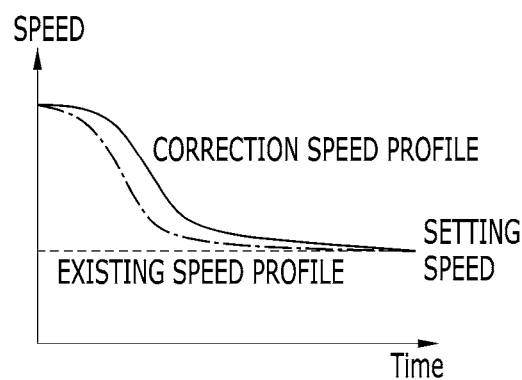
FIGS. 3A and 3B are diagrams illustrating profile correction depending on the state of a car seat according to an embodiment of the present disclosure.
Figure 3B:
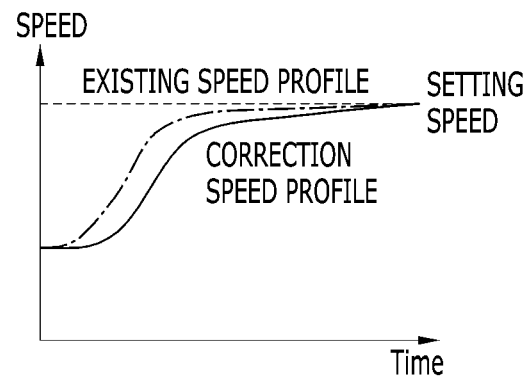

FIGS. 3A and 3B are diagrams illustrating profile correction depending on the state of a car seat according to an embodiment of the present disclosure.

Referring to FIGS. 3A and 3B, the horizontal axis of a graph indicates a time and the vertical axis of the graph indicates a vehicle speed.

Referring to FIG. 3A, when the apparatus for automatically controlling and limiting a speed of a vehicle is activated, a deceleration profile corresponding to the forward facing state 210 may be corrected. Thus, driving according to a correction speed profile may reduce maximum acceleration and jerk to alleviate influence on the infant compared with the case of driving at an existing speed profile.

Figure 4:
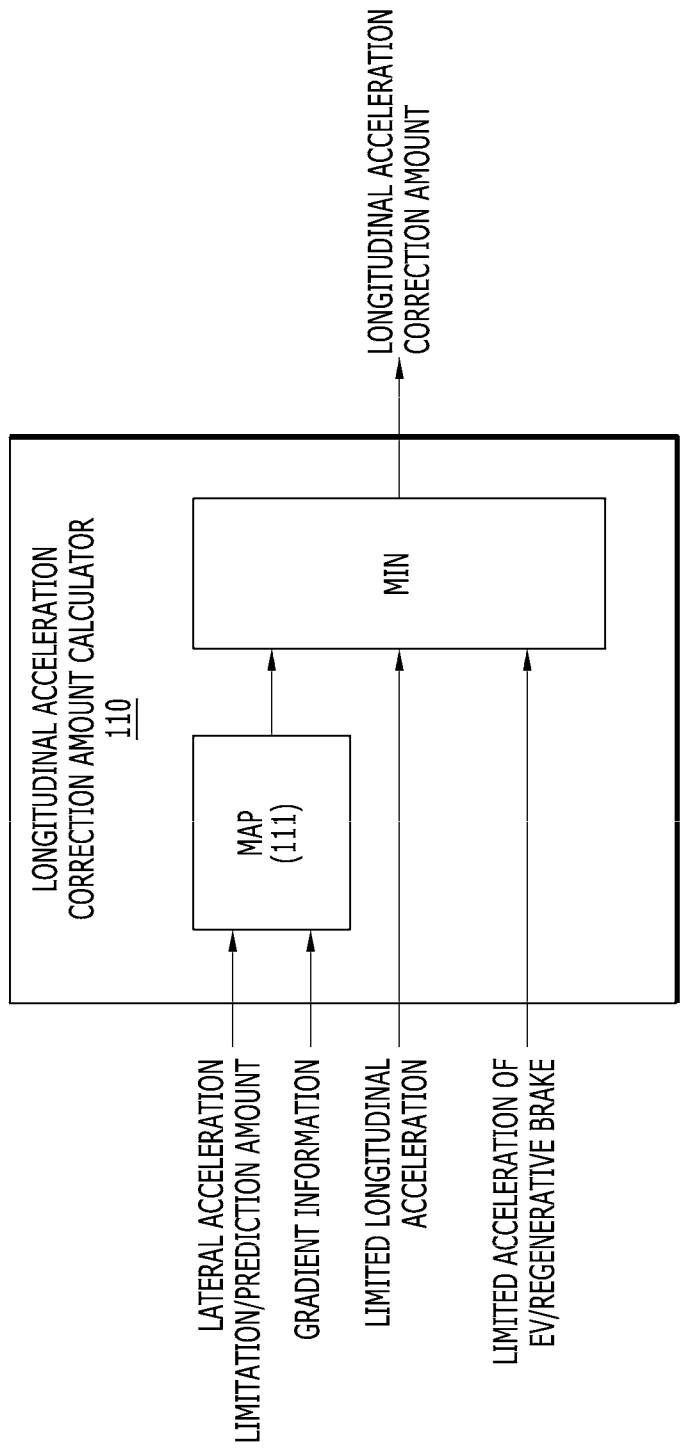
FIG. 4 is a detailed diagram illustrating a longitudinal acceleration correction amount calculator according to an embodiment of the present disclosure.

Referring to FIG. 3B, when the apparatus for automatically controlling and limiting a speed of a vehicle is activated, an acceleration profile corresponding to the rearward facing state 220 may be corrected. Thus, driving according to a correction speed profile may reduce maximum acceleration and jerk to alleviate influence on the infant compared with the case of driving at an existing speed profile. FIG. 4 is a detailed diagram illustrating the longitudinal acceleration correction amount calculator 110 according to an embodiment of the present disclosure.

Referring to FIG. 4, the longitudinal acceleration correction amount calculator 110 may include a MAP 111 that is predetermined through a test in consideration of sensitivity of an infant in response to lateral acceleration.

The longitudinal acceleration correction amount calculator 110 may receive information on a lateral acceleration limitation and prediction amount, gradient information, information on limited longitudinal acceleration, or information on limited regenerative brake acceleration.

In this case, the longitudinal acceleration correction amount calculator 110 may determine a minimum value MIN in consideration of the limited longitudinal acceleration of the MAP 111 and the apparatus for automatically controlling and limiting a speed while the vehicle turns. In the case of an eco-friendly vehicle, in order to enhance fuel efficiency and operability, a torque limitation of a power source that is capable of being relatively smoothly driven due to a high bandwidth of a motor or the like may be considered.

A lateral and longitudinal acceleration may be compensated for through the gradient information. An infant is affected by inertial acceleration, and thus a vehicle behaves in an opposite direction thereto. That is, when the car seat is in the rearward facing state, inertial acceleration of the infant in a forward direction is required, and thus the vehicle may be decelerated via a brake.

FIGS. 5A-5D are diagrams illustrating a longitudinal acceleration correction amount according to an embodiment of the present disclosure.

Figure 5A:
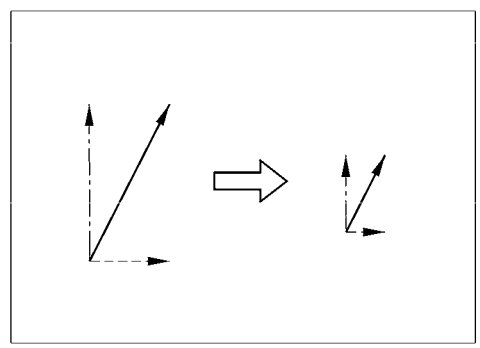
FIGS. 5A, 5B, 5C, and 5D are diagrams illustrating a longitudinal acceleration correction amount according to an embodiment of the present disclosure.

In FIG. 5A, when lateral acceleration is small, the longitudinal acceleration correction amount calculator 110 may correct the longitudinal acceleration correction amount to be reduced.

Figure 5B:
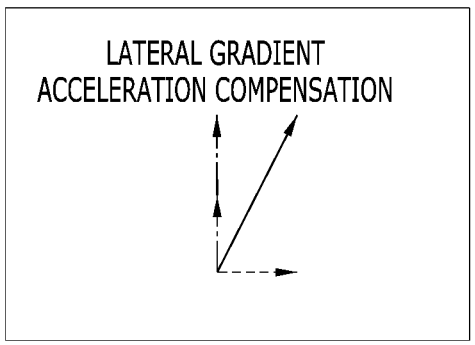

Referring to FIG. 5B, when there is a lateral gradient of a turning road, the longitudinal acceleration correction amount calculator 110 may correct the longitudinal acceleration correction amount in consideration of gradient acceleration $g \sin \theta_{lateral}$.

Figure 5C:
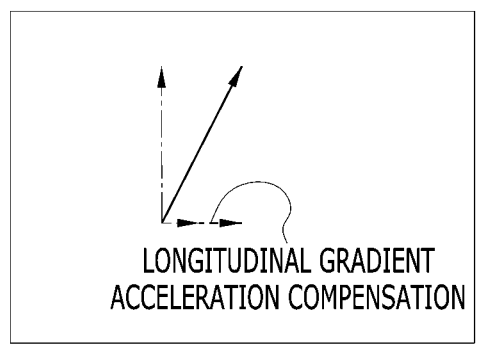

Referring to FIG. 5C, when there is a longitudinal gradient of a turning road, the longitudinal acceleration correction amount calculator 110 may correct the longitudinal acceleration correction amount in consideration of gradient acceleration $g \sin \theta_{longitudinal}$.

Figure 5D:
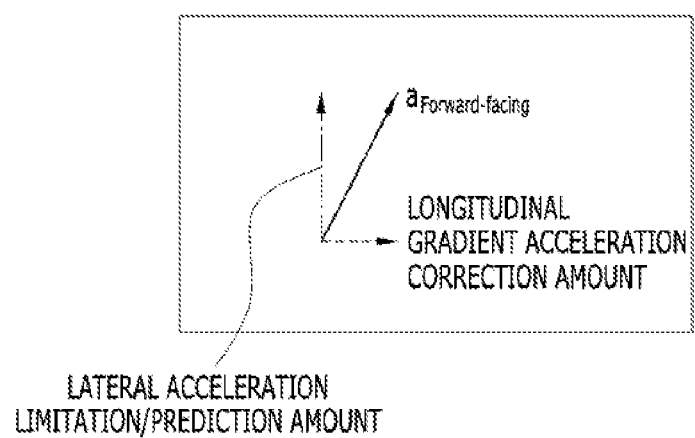

Referring to FIG. 5D, when there is the longitudinal acceleration correction amount calculator 110 may correct the longitudinal acceleration correction amount in consideration of longitudinal and lateral acceleration due to the Coriolis force and longitudinal accelerated motion as well as the gradient acceleration.

Figure 6:
FIG. 6 is a diagram illustrating a speed correction amount of a vehicle in response to an angle of a car seat according to an embodiment of the present disclosure.

FIG. 6 is a diagram illustrating a speed correction amount of a vehicle in response to an angle of a car seat according to an embodiment of the present disclosure.

Referring to FIG. 6, a vehicular speed correction degree may be differentiated in consideration of setting of an angle of a car seat.

In some embodiments, the angle of the car seat may be changed according to a corresponding setting mode. For example, an ordinary setting mode may include a Play Mode, a Rest Mode, and a Sleep Mode and may be subdivided or may be reduced.

The installation angle of the car seat may be increased in the order of the Play Mode, the Rest Mode, and the Sleep Mode. That is, when the car seat is erected, influence on the infant due to acceleration and deceleration is increased, and thus, the angle may be further corrected, and when the car seat is laid down, influence on the infant is reduced, and thus, the angle may be less corrected. When the car seat is laid down, a belt of the infant may be unfastened, the infant loses his or her posture, and the infant's head deviates from the car seat due to rapid acceleration and deceleration, and thus, the angle may be corrected in an opposite direction.

FIGS. 7 to 14 are diagrams illustrating the speed and acceleration profile corrector 120 according to an embodiment of the present disclosure.

FIGS. 7 to 10 are graphs showing acceleration control in a turning section according to an embodiment of the present disclosure.

Figure 7:
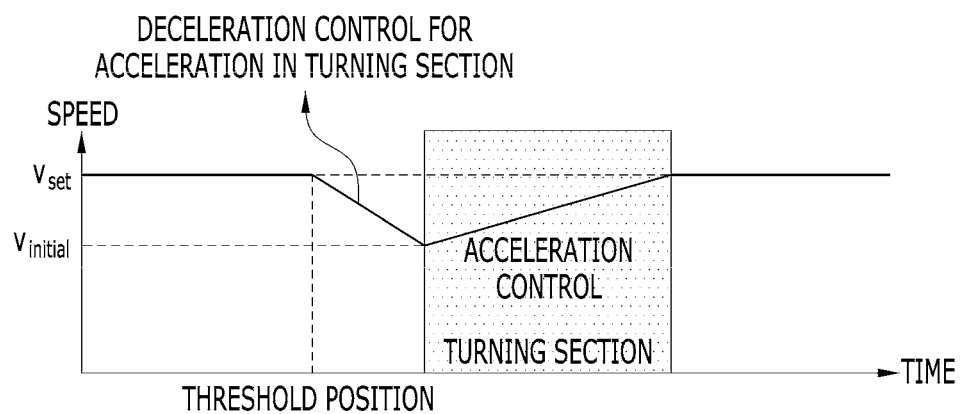
FIGS. 7, 8, 9, 10, 11, 12, 13, and 14 are diagrams illustrating a speed and acceleration profile corrector according to an embodiment of the present disclosure.

Referring to FIG. 7, when performing turning section acceleration control, the speed and acceleration profile corrector 120 may begin deceleration control at a threshold position prior to entry into the turning section by a threshold distance $d_{threshold}$. In this case, deceleration $a_{decel}$ may be controlled to a preset value through the limited longitudinal acceleration of the apparatus for automatically controlling and limiting a speed or a test. The speed and acceleration profile corrector 120 may perform acceleration control based on a longitudinal acceleration correction amount $a_{long,\ mody}$ calculated by the longitudinal acceleration correction amount calculator 110 after entry into the turning section. In this case, a turning section initial speed $v_{initial}$ and a threshold distance $d_{threshold}$ may be calculated according to Equation 1 below in consideration of a preset appropriate margin that is preset by a setting speed $v_{set}$, a turning section length $d_{corner}$, a deceleration control deceleration $a_{decel}$ for acceleration in a turning section, a longitudinal acceleration correction amount $a_{long,\ mody}$, and uniformly accelerated motion relational expression and test.

$$v_{initial} = \sqrt{v_{set}^2 - 2a_{long,mody}d_{corner}} - v_{margin} \quad \text{[Equation 1]}$$

$$d_{threshold} = \frac{v_{set}^2 - v_{initial}^2}{2a_{decel}} + d_{margin}$$

Figure 8:
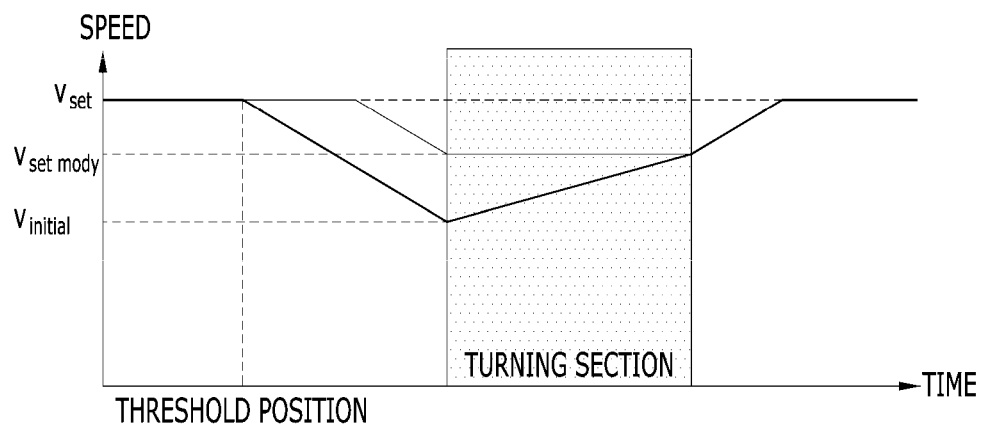

However, as shown in FIG. 8, a control/limited speed $v_{set,mody}$ of the apparatus for automatically controlling and limiting a speed may be equal to or less than a user setting speed $v_{set}$ by a function according to lateral acceleration limitations (ACSF regulations), adaptive cornering cruise control, or the like, and in consideration of this, the turning section initial speed $v_{initial}$ calculated in FIG. 7 may be changed according to Equation 2 below.

$$v_{initial} = \sqrt{v_{set,mody}^2 - 2a_{long,mody}d_{corner}} - v_{margin} \quad \text{[Equation 2]}$$

Thus, a value of the threshold distance $d_{threshold}$ may also be changed.

Figure 9:
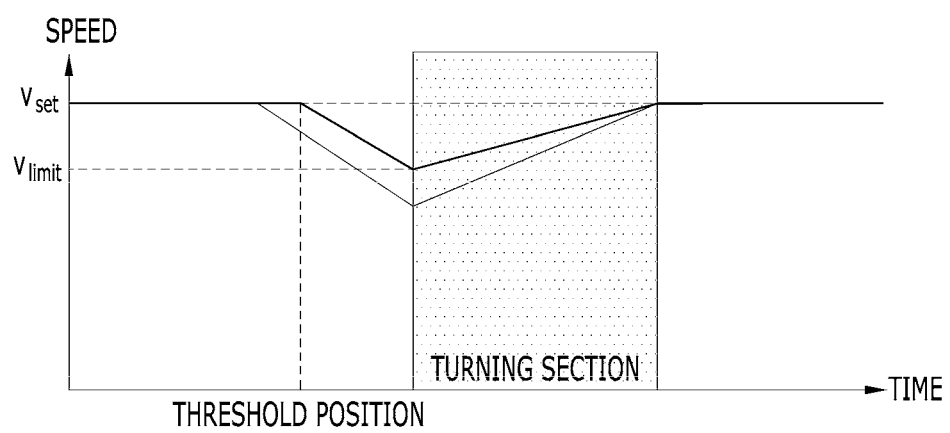

As shown in FIG. 9, when there is the limited speed $v_{set,mody}$ of the apparatus for automatically controlling and limiting a speed or the lowest speed $v_{limit}$ on a road, the turning section initial speed $v_{initial}$ calculated in FIG. 7 may be changed according to Equation 3 below.

$$v_{initital} = \max\left(\sqrt{v_{set}^2 - 2a_{long,mody}d_{corner}},\ v_{limit}\right) + v_{margin} \quad \text{[Equation 3]}$$

$$a_{long,mody,limit} = \frac{v_{set}^2 - v_{initial}^2}{2d_{corner}} - a_{margin}$$

Accordingly, a value of the threshold distance $d_{threshold}$ may also be changed. In this case, acceleration in a turning section may be controlled by the limited longitudinal acceleration correction amount $a_{long,mody,limit}$ but not the longitudinal acceleration correction amount $a_{long,\ mody}$ calculated by the longitudinal acceleration correction amount calculator 110.

Figure 10:
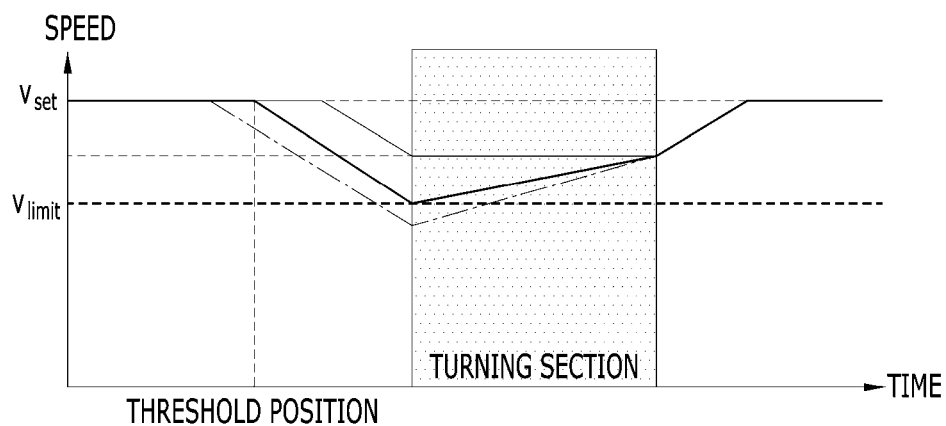

Thus, as shown in FIG. 10, the speed and acceleration profile corrector 120 may change the turning section initial speed $v_{initial}$ calculated in FIG. 7 in consideration of all of the user setting speed $v_{set}$, the limited speed $v_{set,mody}$ of the apparatus for automatically controlling and limiting a speed, and the lowest speed $v_{limit}$ on a road according to Equation 4 below.

$$v_{initial} = \max\left(\sqrt{v_{set,mody}^2 - 2a_{long,mody}d_{corner}},\ v_{limit}\right) + v_{margin} \quad \text{[Equation 4]}$$

$$a_{long,mody,limit} = \frac{v_{set,mody}^2 - v_{initial}^2}{2d_{corner}} - a_{margin}$$

Thus, a value of the threshold distance $d_{threshold}$ may also be changed. In this case, acceleration in a turning section may be controlled by the limited longitudinal acceleration correction amount $a_{long,mody,limit}$ but not the longitudinal acceleration correction amount $a_{long,\ mody}$ calculated by the longitudinal acceleration correction amount calculator 110.

FIGS. 11 to 14 are graphs showing deceleration control in a turning section according to an embodiment of the present disclosure.

Figure 11:
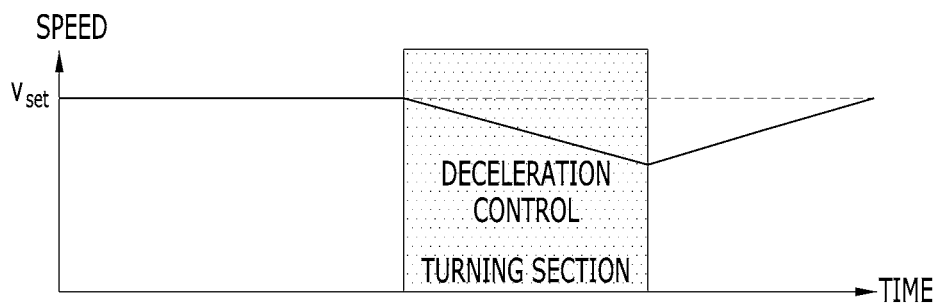

Referring to FIG. 11, during turning section deceleration control, after a vehicle enters the turning entry, the speed and acceleration profile corrector 120 may perform deceleration control based on the longitudinal acceleration correction amount $a_{long,mody}$ calculated by the longitudinal acceleration correction amount calculator 110. Then, when the vehicle passes through the turning section, the original speed may be recovered through control of the apparatus for automatically controlling and limiting a speed.

Figure 12:
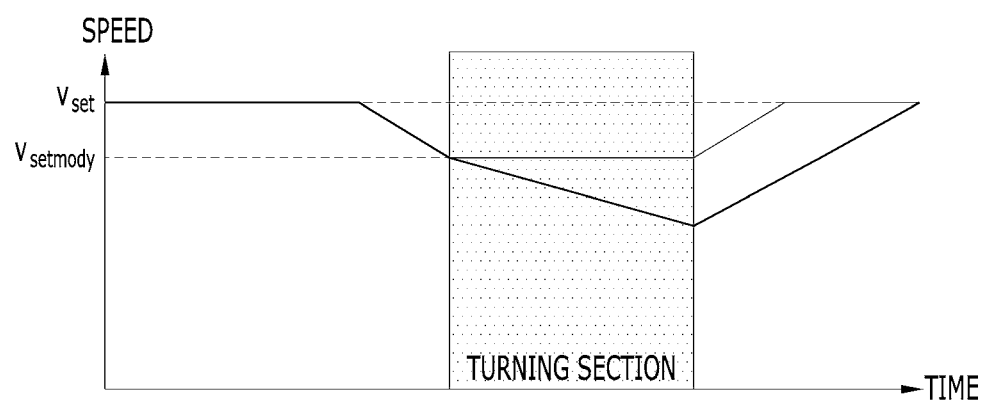

However, as shown in FIG. 12, when there is the control/limited speed $v_{set,mody}$ of the apparatus for automatically controlling and limiting a speed, after the vehicle enters the turning section, the speed and acceleration profile corrector 120 may also perform deceleration control based on the longitudinal acceleration correction amount $a_{long,mody}$ calculated by the longitudinal acceleration correction amount calculator 110 in the same way. Then, when the vehicle passes through the turning section, the longitudinal acceleration correction amount $a_{long,\ mody}$.

Figure 13:
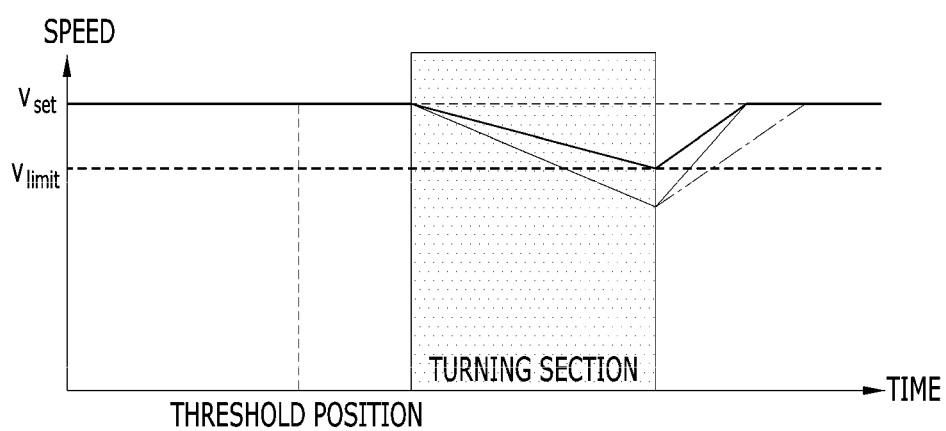

As shown in FIG. 13, when there is the limited speed of the apparatus for automatically controlling and limiting a speed or the lowest speed vomit on a road, and in consideration of this, the deceleration in the turning section may be controlled by the limited longitudinal acceleration correction amount $a_{long,\ mody,\ limit}$ but not the longitudinal acceleration correction amount $a_{long,mody}$ calculated by the longitudinal acceleration correction amount calculator 110. The limited longitudinal acceleration correction amount $a_{long,\ mody,\ limit}$ may be calculated according to Equation 5 below.

$$a_{long,mody,limit} = \frac{v_{set}^2 - v_{limit}^2}{2d_{corner}} + a_{margin} \quad \text{[Equation 5]}$$

Then, when the vehicle passes through the turning section, the original speed may be recovered through control of the apparatus for automatically controlling and limiting a speed.

Figure 14:
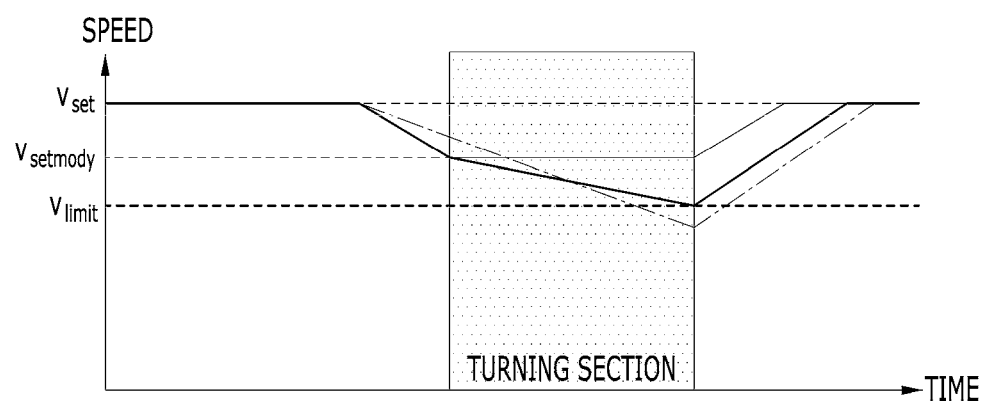

Thus, as shown in FIG. 14, the deceleration in the turning section calculated by the speed and acceleration profile corrector 120 may be controlled based on the limited longitudinal acceleration correction amount $a_{long,mody,limit}$ but not the longitudinal acceleration correction amount $a_{long,\ mody}$ calculated by the longitudinal acceleration correction amount calculator 110. The limited longitudinal acceleration correction amount $a_{long,\ mody,\ limit}$ may be calculated according to Equation 6 below.

$$a_{long,mody,limit} = \frac{v_{set,mody}^2 - v_{limit}^2}{2d_{corner}} + a_{margin} \quad \text{[Equation 6]}$$

Then, when the vehicle passes through the turning section, the original speed may be recovered through control of the apparatus for automatically controlling and limiting a speed.

Figure 15:
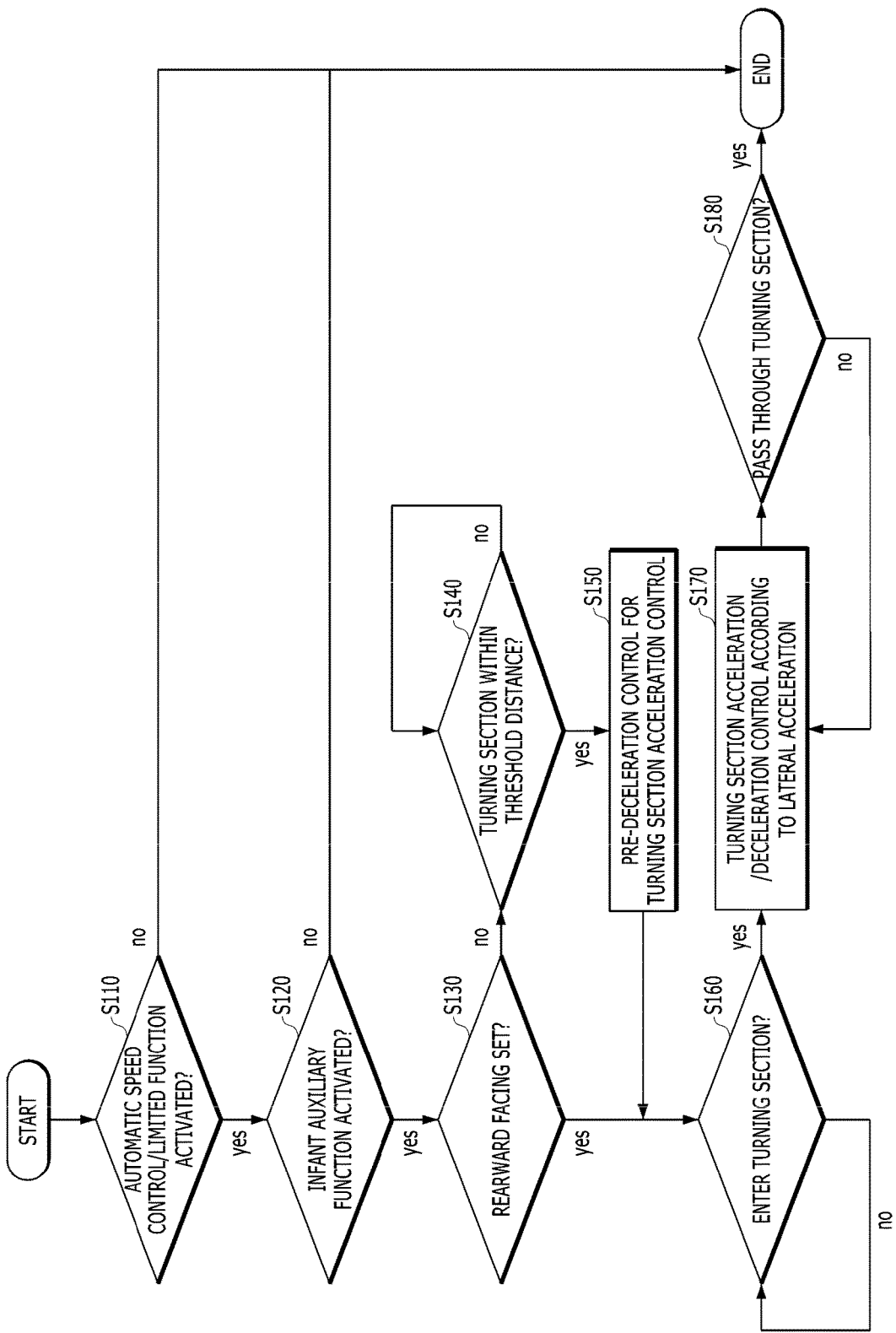
FIG. 15 is a flowchart illustrating a method of controlling vehicle driving depending on a baby mode according to an embodiment of the present disclosure.

FIG. 15 is a flowchart illustrating a method of controlling vehicle driving depending on a baby mode according to an embodiment of the present disclosure.

Referring to FIG. 15, the vehicle driving control apparatus 100 may determine whether an apparatus for automatically controlling and limiting a speed is activated (S110).

After operation S110, when the apparatus for automatically controlling and limiting a speed is activated, the vehicle driving control apparatus 100 may determine whether an infant correction function is activated (S120).

After operation S120, when the infant correction function is activated, the vehicle driving control apparatus 100 may determine whether a car seat is in the rearward facing state 220 (S130).

After operation S130, when the car seat is in the rearward facing state 220 (NO of S130), the vehicle driving control apparatus 100 may determine whether the turning section is within a threshold distance (S140).

After operation S140, when the turning section is within the threshold distance (YES of S140), the vehicle driving control apparatus 100 may perform deceleration control for turning section acceleration control (S150).

After operation S130 or S150, the vehicle driving control apparatus 100 may determine whether the vehicle enters the turning section (S160).

After operation S160, when the vehicle enters the turning section (YES of S160), the vehicle driving control apparatus 100 may perform at least one of acceleration or deceleration in the turning section based on the lateral acceleration (S170).

After operation S170, the vehicle driving control apparatus 100 may determine whether the vehicle passes through the turning section (S180).

The method of controlling vehicle driving depending on a baby mode according to the present disclosure may prevent the infant's head from deviating from a car seat by appropriately correcting a speed and acceleration profile while a vehicle trans depending on whether the car seat is in a forward facing or rearward facing state, thereby advantageously enhancing ride comfort and safety.

The performance of existing adaptive cornering cruise control may be updated one step, thereby advantageously enhance the marketability of a vehicle.

It will be appreciated by persons skilled in the art that that the effects that could be achieved with the present disclosure are not limited to what has been particularly described hereinabove and other advantages of the present disclosure will be more clearly understood from the detailed description.

The aforementioned method according to embodiments may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, code, and code segments for accomplishing the present disclosure may be easily construed by programmers skilled in the art to which the present disclosure pertains.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

What is claimed is:

1. A method of controlling a vehicle driving depending on a baby mode, the method comprising:
   activating an apparatus for automatically controlling and limiting a speed of a vehicle, and determining a direction at which a car seat is installed when the car seat is installed;
   correcting a speed profile of the apparatus for automatically controlling and limiting the speed of the vehicle in a turning section based on the direction of the car seat;
   determining whether the vehicle enters the turning section;
   when the vehicle enters the turning section, performing at least one of turning section acceleration control or turning section deceleration control based on the direction of the car seat; and
   determining whether the vehicle passes through the turning section after performing at least one of the turning section acceleration or deceleration.

2. The method of claim 1, wherein the correcting the speed profile of the apparatus includes:
   when the direction of the car seat is in a forward facing state, calculating a longitudinal deceleration correction amount of the apparatus for automatically controlling and limiting the speed.

3. The method of claim 1, wherein the correcting the speed profile of the apparatus includes:
   when the direction of the car seat is in a rearward facing state, calculating a longitudinal acceleration correction amount of the apparatus for automatically controlling and limiting the speed.

4. The method of claim 1, further comprising:
   changing a longitudinal acceleration correction amount depending on an angle at which the car seat is installed.

5. The method of claim 1, wherein the correcting the speed profile of the further includes:
   calculating a maximum value as a longitudinal acceleration correction amount based on a MAP set in response to a lateral acceleration and a limited longitudinal acceleration of the apparatus for automatically controlling and limiting the speed when the vehicle turns.

6. The method of claim 1, wherein, if the vehicle enters the turning section, the performing at least one of turning section acceleration control or turning section deceleration control includes:
   correcting the speed profile in a direction in which the vehicle is accelerated when the direction of the car seat is in a forward facing state.

7. The method of claim 1, wherein, if the vehicle enters the turning section, the performing at least one of turning section acceleration control or turning section deceleration control includes:
   when the direction of the car seat is in a rearward facing state, correcting the speed profile in a direction in which the vehicle is decelerated.

8. The method of claim 5, wherein, when the vehicle enters the turning section, the performing the turning section acceleration control includes:
   performing deceleration control at a first threshold position prior to entry into the turning section by a first threshold distance, or when there is a limited speed of the apparatus for automatically controlling and limiting the speed or a lowest speed $v_{limit}$ on a road, performing deceleration control at a second threshold position prior to entry into the turning section by a second threshold distance; and after the deceleration control, entering the turning section and performing turning section acceleration control in response to the calculated longitudinal acceleration correction amount.

9. The method of claim 5, wherein:

when the vehicle enters the turning section, the performing the turning section acceleration control includes:

performing deceleration control based on the calculated longitudinal acceleration correction amount in the turning section; and after an escape from the turning section, performing acceleration at a setting speed of the apparatus for automatically controlling and limiting the speed; and the performing the deceleration control includes:

performing deceleration control based on a limited longitudinal acceleration correction amount when there is a limited speed of the apparatus for automatically controlling and limiting the speed or a lowest speed on a road.

10. A non-transitory computer-readable recording medium having recorded thereon a program for executing the method of claim 1.

11. A vehicle driving control apparatus comprising:

a longitudinal acceleration correction amount calculator configured to activate an apparatus for automatically controlling and limiting a speed of a vehicle, to determine a direction at which a car seat is installed when the car seat is installed, and to correct a speed profile of the apparatus for automatically controlling and limiting the speed of the vehicle in a turning section based on the direction of the car seat;

a speed and acceleration profile corrector configured to determine whether the vehicle enters the turning section, and to perform at least one of turning section acceleration control or turning section deceleration control based on the direction of the car seat when the vehicle enters the turning section; and a control torque calculator configured to calculate control torque in response to a profile received from the longitudinal acceleration correction amount calculator and the speed and acceleration profile corrector.

12. The vehicle driving control apparatus of claim 11, wherein the longitudinal acceleration correction amount calculator calculates a longitudinal deceleration correction amount of the apparatus for automatically controlling and limiting the speed when the direction of the car seat is in a forward facing state.

13. The vehicle driving control apparatus of claim 11, wherein the longitudinal acceleration correction amount calculator calculates a longitudinal acceleration correction amount of the apparatus for automatically controlling and limiting the speed when the direction of the car seat is in a rearward facing state.

14. The vehicle driving control apparatus of claim 11, wherein the longitudinal acceleration correction amount calculator calculates a longitudinal acceleration correction amount of the apparatus for automatically controlling and limiting the speed depending on an angle at which the car seat is installed.

15. The vehicle driving control apparatus of claim 11, wherein the longitudinal acceleration correction amount calculator calculates a maximum value as a longitudinal acceleration correction amount based on a MAP set in response to a lateral acceleration and a limited longitudinal acceleration of the apparatus for automatically controlling and limiting the speed when the vehicle turns.

16. The vehicle driving control apparatus of claim 11, wherein, if the vehicle enters the turning section, when performing at least one of turning section acceleration control or turning section deceleration control, the longitudinal acceleration correction amount calculator corrects the speed profile in a direction in which the vehicle is accelerated when the direction of the car seat is in a forward facing state.

17. The vehicle driving control apparatus of claim 11, wherein, if the vehicle enters the turning section, when performing at least one of turning section acceleration control or turning section deceleration control, the longitudinal acceleration correction amount calculator corrects the speed profile in a direction in which the vehicle is decelerated when the direction of the car seat is in a rearward facing state.

18. The vehicle driving control apparatus of claim 15, wherein, when performing the turning section acceleration control, the speed and acceleration profile corrector performs deceleration control at a first threshold position prior to entry into the turning section by a first threshold distance, or when there is a limited speed of the apparatus for automatically controlling and limiting the speed or a lowest speed $v_{limit}$ on a road, the speed and acceleration profile corrector performs deceleration control at a second threshold position prior to entry into the turning section by a second threshold distance, and after the deceleration control, the speed and acceleration profile corrector enters the turning section and performs turning section acceleration control in response to the calculated longitudinal acceleration correction amount.

19. The vehicle driving control apparatus of claim 15, wherein:

when performing the turning section deceleration control, the speed and acceleration profile corrector performs deceleration control based on the calculated longitudinal acceleration correction amount in the turning section, and after an escape from the turning section, the speed and acceleration profile corrector performs acceleration at a setting speed of the apparatus for automatically controlling and limiting the speed; and the deceleration control includes deceleration control based on a limited longitudinal acceleration correction amount when there is a limited speed of the apparatus for automatically controlling and limiting the speed or a lowest speed on a road.

* * * * *